United States Patent [19]

Moses

[11]  4,279,972
[45]  Jul. 21, 1981

[54] NON-AQUEOUS ELECTROLYTE CELL

[75] Inventor: Peter R. Moses, Windham, N.H.

[73] Assignee: Duracell International Inc., Bethel, Conn.

[21] Appl. No.: 70,198

[22] Filed: Aug. 27, 1979

[51] Int. Cl.$^3$ ............................................. H01M 10/44
[52] U.S. Cl. ....................................... 429/50; 429/57; 429/194
[58] Field of Search .................... 429/194, 197, 50, 57

[56]  References Cited

U.S. PATENT DOCUMENTS

| | | | |
|---|---|---|---|
| 4,133,856 | 1/1979 | Ikeda et al. | 429/224 X |
| 4,158,722 | 6/1979 | Lauck | 429/194 |
| 4,160,070 | 7/1979 | Margarlit | 429/194 |
| 4,163,829 | 8/1979 | Kronenberg | 429/194 |
| 4,166,888 | 9/1979 | Rao | 429/194 |
| 4,176,214 | 11/1979 | Klinedinst | 429/194 |

Primary Examiner—Charles F. LeFevour
Attorney, Agent, or Firm—Ronald S. Cornell; Israel Nissenbaum; Martin M. Glazer

[57]  ABSTRACT

A non-aqueous electrolyte cell particularly one containing a beta manganese dioxide cathode wherein the cathode is normally rigorously heat treated to drive off contained water. The heat treatment is substantially reduced or eliminated (allowing up to 2% water by weight of the cathode to remain in the cell) by utilizing as an electrolyte salt in the cell, a salt which reacts with water to only form a weak oxidizing agent which in turn does not react with the electrolyte solvent to form a gaseous product. Alternatively, an electrolyte solvent is initially utilized in the cell, which solvent does not react with strong oxidizing agents to form a gaseous product.

18 Claims, No Drawings

NON-AQUEOUS ELECTROLYTE CELL

This invention relates to non-aqueous electrolyte cells requiring rigorous heat treatment of the components particularly the cathode, to drive off contained water. More particularly the present invention relates to such cells containing lithium anodes and beta-manganese dioxide cathodes.

High energy density anode materials such as the alkali or alkaline earth metals which include lithium, sodium, potassium, magnesium and calcium, as well as other metals above hydrogen in the EMF series tend to react with water to various degrees with resultant, sometimes very detrimental, evolution of hydrogen gas. Accordingly, cells containing such anodes are constructed by excluding water therefrom and with the utilization of various organic and inorganic electrolyte salt solvents. In order to ensure that water is totally excluded, during the preparation of the component parts of the cells such components are additionally rigorously heat treated.

In the preparation of manganese dioxide for use in non-aqueous electrolyte cells, (particularly those containing lithium anodes) common electrolytic manganese dioxide (gamma-$MnO_2$) is heated to temperatures above 250° C. The water contained therein is substantially driven off and the crystalline structure of the gamma $MnO_2$ is gradually converted to the beta $MnO_2$ form. Thereafter the beta $MnO_2$ is formed, with suitable binders and conducting agents into cathodes. However, in order to fully provide for effective utilization of the beta $MnO_2$ in non-aqueous cells, a second heating step is required in order to completely remove all retained water therein. The formed beta $MnO_2$ cathode must be heated to temperatures between 200° and 350° C. prior to insertion in the cell as described in U.S. Pat. No. 4,133,856. Without the aforementioned second heating step, the cells generally swell and leak electrolyte. In the above U.S. patent, the temperatures between 200° and 350° C., are described as being critical. Heating at a lower temperature such as at 150° C. is specifically described as resulting in cells having drastically reduced realizable discharge capacity. However such rigorous thermal pretreatment of the finished cathodes, especially for extended periods of time, entails a costly manufacturing procedure.

It is an object of the present invention to provide non-aqueous cells having components therein which do not require rigorous heat treatment to drive off contained water.

It is a further object of the present invention to provide such cells which have beta $MnO_2$ cathodes.

It is a still further object to provide such cells wherein detrimental swelling of the cell is reduced and capacity is retained.

These and other objects, features and advantages of the present invention will be more clearly seen from the following discussion.

The detrimental swelling (generally 20% or more of the original cell height) phenomenon in cells containing "non" or insufficiently heated components, such as cathodes, has been generally attributed to water leaching out of the cathodes and reacting with active metal anodes to form hydrogen gas. It is generally believed that the same considerations which preclude use of an aqueous electrolyte (reaction of water with the active metal anode) preclude the presence of any water in the organic or inorganic electrolyte used as a substitute therefor. It has however been suprisingly discovered that the presumed reaction between the active metal anode and insufficiently driven off water in a non-aqueous cell does not in fact occur to detrimentally affect such cell. In cells containing non-thermally treated cathodes the measured hydrogen evolution (the expected reaction product between active metals and water) is substantially the same as that of cells containing thermally treated cathodes. In fact "cells" without anodes therein, containing the non-thermally treated cathodes, still showed a tendency to swell. It was further surprisingly discovered that the detrimental swelling and leakage from cells containing small amounts of water could be attributed to the interaction between the water, the electrolyte salt and the non-aqueous electrolyte salt solvent which resulted in the evolution of detrimental gases.

Since it was previously believed that the source of the detrimental gas was the reaction between the contained water and the active metal anode it was not believed possible to affect such reaction by the use of differing electrolyte salts or non-aqueous electrolyte salt solvents. Accordingly, rigorous heat treatment was believed to be an absolute requirement in driving off contained water. With such heat treatment and the absence of contained water, the choice of electrolyte salt and electrolyte solvent was generally dictated by conductivity considerations. Thus in cells containing beta manganese dioxide cathodes the most effective electrolyte salt solution was found to comprise lithium perchlorate ($LiClO_4$) in a 1:1 by weight mixture of dimethoxyethane (DME) and propylene carbonate (PC).

Generally, the present invention comprises the utilization of specific electrolyte salts and/or electrolyte salt solvents, in non-aqueous electrolyte cells, in place of the commonly utilized electrolyte salts and/or solvents which have been found to result in detrimental gas evolution. The utilization of such specific electrolyte salts and/or electrolyte salt solvents permits the cells to accommodate cell components such as cathodes having small amounts, up to 2% by weight thereof, of water therein with little adverse swelling or leakage effects. Accordingly, the expensive component preheating steps at elevated temperatures for long durations may be reduced or eliminated.

It has been found that the electrolyte salts which result in detrimental gas evolution generally comprise salts which, when reacted with water, form relatively strong oxidizing agents. For example, the lithium perchlorate commonly used in Li/$MnO_2$ cells when reacted with water will form the strongly oxidizing perchloric acid ($HClO_4$). It has been similarly discovered that lithium trifluoroacetate when used as an electrolyte salt will also result in detrimental gas formation. Such salt also forms a relatively strong oxidizing carboxylic acid.

It has been additionally found that electrolyte salt solvents which are reactive with oxidizing agents with resultant gaseous evolution will in fact provide cells (having retained water therein) which swell and leak when used in conjunction with electrolyte salts which form strongly oxidizing acids. However, such electrolyte salt solvents do not detrimentally affect cells (having retained water therein) in which electrolyte salts are used which do not form strong oxidizing acids when combined with water. For example propylene carbonate which is susceptible to oxidation will evolve a gas, presumably $CO_2$, when utilized in a cell having retained water therein and containing $LiClO_4$ as the electrolyte. However, when utilized in a cell containing an electrolyte salt such as $LiPF_6$ which forms a weak oxidizing acid, there is a little adverse effect on the dimensional stability of the cell.

It has been additionally discovered that elecytrolyte salt solvents which react with strong oxidants but without the evolution of a gaseous product, may be used with little adverse effect in cells (having retained water therein) containing strong oxidizing acid forming electrolyte salts such as lithium perchlorate. Thus dioxolane, (OX) which is not oxidized to a gaseous reaction product may be substituted as an electrolyte salt solvent for the gaseous reaction product producing propylene carbonate in cells (having retained water therein) containing electrolyte salts such as $LiClO_4$.

It is of course understood that the reaction consequences are not the only criteria for the selection of proper electrolyte salts and electrolyte salt solvents. It is additionally necessary that the electrolyte solution of salt and solvent have sufficient conductivity to enable useful utilization of the capacity and rates possible with the electrode components of the cell. However, salts other than lithium perchlorate which do not form highly oxidizing acids in the presence of water generally do not possess the generally high conductivity attributes of the lithium perchlorate. However, several electrolyte salts have been discovered which form only weak oxidizing acids in the presence of water and also enable cells (containing desirable solvents such as PC but which are susceptible to oxidizing acid attack) to operate at moderate drain rates and with good capacities comparable to that of the cells containing the lithium perchlorate electrolyte salt. Examples of such salts include $LiPF_6$, $LiCF_3SO_3$ and to a lesser extent $LiBF_4$.

Examples of salts which result in cell swelling similar to that of $LiClO_4$ include $LiAsF_6$ and $LiCF_3CO_2$.

Solvents which provide requisite conductivity with dissolved electrolyte salt therein and which are not generally susceptible to oxidizing acid attack include dioxolane (OX), gamma-butyrolactone (BL) and diglyme (DG).

The following examples illustrate the utilization of various electrolyte salts and various electrolyte salt solvents and their effect on only moderately heat treated beta $MnO_2$ consolidated cathodes in terms of swelling behavior and cell capacities. The examples are for illustrative purposes only and as a clarification of the present invention and should not be considered as a limitation thereof. All parts are parts by weight unless otherwise indicated.

EXAMPLE 1 (PRIOR ART)

A flat button cell (0.1″ height by 1″ diameter) is constructed containing a lithium foil disk weighing about 70 mg, a non-woven polypropylene disk separator and a cathode disk pressed from 1 gram of a mixture of 90% beta $MnO_2$, 6% graphite and 4% Teflon powder. The electrolyte is about 275 mg of a 1 M $LiClO_4$ in a 1:1 mixture propylene-carbonate-dimethoxyethane solution. Prior to assembly, within the cell, the pressed cathode disk is vacuum dried at 300° C. for 6 hours. After cell assembly the cell is heated for 1 hour to 115° C. and cooled to room temperature. The cell height increases from 0.104″ to 0.109″. When discharged, the cell yields 220 mAhr at a discharge rate of 1 mA to a cutoff at 2.40 volts.

EXAMPLE 2 (MODIFIED PRIOR ART)

A cell made in accordance with Example 1 but with the cathode disk, vacuum dried to only 150° C. for 3 hours prior to assembly within the cell, thereafter being heated for 1 hour to 115° C. and cooled to room temperature. The cell height increases from 0.106″ to 0.141″ approximately a 30% increase in height.

EXAMPLE 3

A cell is made in accordance with Example 2 and treated identically but with 1 M $LiPF_6$ in PC-DME as the electrolyte. When thermally treated at 115° C. for 1 hour and cooled to room temperature the cell height increases from 0.105″ to 0.110″. When discharged, the cell yields 217 mAhr at a discharge rate of 1 mA to a cutoff at 2.40 volts.

EXAMPLE 4

A cell is made in accordance with Example 2 and treated identically but with 1 M $LiCF_3SO_3$ in PC-DME as the electrolyte. When thermally treated at 115° C. for 1 hour and cooled to room temperature the cell height increases from 0.105″ to 0.118″. When discharged the cell yields 202 mAhr at a discharge rate of 1 mA to a cutoff at 2.40 volts.

EXAMPLE 5

A cell is made in accordance with Example 2 but with a diglyme electrolyte solvent in place of the PC-DME mixture. After the cell is heated for 1 hour at 115° C. and cooled to room temperature, the cell expansion is about 10 mils.

From the preceding examples, it is clearly seen that the substitution for $LiClO_4$ of the weak oxidizing agent forming $LiPF_6$, as an electrolyte salt in a cell (having retained water therein) even with a gas forming oxidizable solvent (PC) improves the cell's dimensional stability. Alternatively, it is also evident that the substitution of a non-gas forming solvent even with the strong oxidizing agent forming $LiClO_4$ electrolyte also improves the cell dimensional stability.

In addition to the aforementioned beta $MnO_2$ other cathode materials which generally retain water and are normally rigorously heat treated particularly include metal oxides such as $TiO_2$, $SnO$, $MoO_3$, $V_2O_5$, $CrO_3$, $PbO$ $Fe_2O_3$ and generally transition metal oxides.

It is understood however that the foregoing examples are for illustrative purposes only and that details contained therein are not to be considered limitations of the present invention as defined in the following claims.

What is claimed is:

1. A stabilized electrochemical cell comprising an anode comprised of a metal above hydrogen in the EMF series, a water retaining metal oxide cathode having water in normally detrimental amounts up to 2% by weight thereof retained therein, a nonaqueous electrolyte solvent and an electrolyte salt dissolved in said solvent characterized in that said solvent and said salt are substantially unreactive with respect to the formation of a gaseous reaction product in the presence of said water and wherein said salt is selected from the group consisting of lithium salts of $PF_6{}^-$, $CF_3SO_3{}^-$ and $BF_4{}^-$.

2. The cell of claim 1 wherein said cathode comprises manganese dioxide.

3. The cell of claim 2 wherein said solvent is selected from the group consisting of dioxolane, gamma-butyrolactone and diglyme.

4. The cell of claim 2 wherein said manganese dioxide comprises beta manganese dioxide.

5. The cell of claim 4 wherein said anode comprises lithium.

6. A stable electrochemical cell comprising an anode comprised of lithium, a cathode comprised of manganese dioxide with water in normally detrimental amounts up to 2% by weight thereof retained therein, a non-aqueous electrolyte solvent and an electrolyte salt dissolved in said solvent wherein said salt consists of $LiPF_6$ and wherein said $LiPF_6$ salt and said solvent are substantially unreactive in the formation of a gaseous reaction product in the presence of said water.

7. The cell of claim 6 wherein said manganese dioxide comprises beta manganese dioxide.

8. The cell of claim 6 wherein said solvent comprises propylene carbonate.

9. A method for preventing detrimental gas evolution in a non-aqueous electrochemical cell having an anode above hydrogen in the EMF series, a cathode with water in normally detrimental amounts up to 2% by weight thereof retained therein and as electrolyte a solution of an electrolyte salt dissolved in a non-aqueous solvent, comprising using, as non-aqueous solvent and electrolyte salt selected from the group consisting of lithium salts of $PF_6^-$, $CF_3SO_3^-$, and $BF_4^-$ dissolved therein, materials which are, in the presence of water, substantially unreactive to form a gaseous reaction product.

10. The method of claim 9 wherein said electrolyte salt forms a weak oxidizing agent when in the presence of water.

11. The method of claim 9 wherein said solvent is unreactive with strong oxidizing agents to form a gaseous reaction product.

12. The method of claim 9 wherein said cathode comprises $MnO_2$.

13. The method of claim 12 wherein said $MnO_2$ comprises beta $MnO_2$.

14. The method of claim 13 wherein said anode comprises lithium.

15. The method of claim 1 wherein said salt comprises $LiPF_6$.

16. A stabilized electrochemical cell comprising an anode comprised of a metal above hydrogen in the EMF series, a water retaining metal oxide cathode having water in normally detrimental amounts up to 2% by weight thereof retained therein, a non-aqueous electrolyte solvent and an electrolyte salt dissolved in said solvent characterized in that said solvent and said salt are substantially unreactive with respect to the formation of a gaseous reaction product in the presence of said water and wherein said solvent is selected from the group consisting of dioxolane, gamma-butyrolactone and diglyme.

17. The cell of claim 1 or 16 wherein said metal oxide is selected from the group consisting of $TiO_2$, $SnO$, $MoO_3$, $V_2O_5$, $PbO$, $Fe_2O_3$ and $MnO_2$.

18. The cell of claim 16 wherein said electrolyte salt comprises $LiClO_4$.

* * * * *